United States Patent [19]
Chou et al.

[11] Patent Number: 5,817,415
[45] Date of Patent: Oct. 6, 1998

[54] MELTBLOWN IONOMER MICROFIBERS AND NON-WOVEN WEBS MADE THEREFROM FOR GAS FILTERS

[75] Inventors: Richard Tien-Hua Chou, Wilmington; Patrick Stephen Ireland, Hockessin; Charles John Molnar, Wilmington, all of Del.; Hyun Sung Lim, Chesterfield, Va.; Hyunkook Shin, Wilmington, Del.

[73] Assignee: E. I. du Pont de Nemours and Company, Wilmington, Del.

[21] Appl. No.: 712,743

[22] Filed: Sep. 12, 1996

[51] Int. Cl.[6] ........................................................ D02G 3/00
[52] U.S. Cl. ............................ 428/359; 428/364; 428/394
[58] Field of Search ..................................... 428/359, 374, 428/364, 394

[56] References Cited

U.S. PATENT DOCUMENTS

| | | | |
|---|---|---|---|
| 4,215,682 | 8/1980 | Kubik et al. | 128/205.29 |
| 4,375,718 | 3/1983 | Wadsworth et al. | 29/592 |
| 4,588,537 | 5/1986 | Klaase et al. | 264/22 |
| 4,592,815 | 6/1986 | Nakao | 204/165 |
| 4,626,263 | 12/1986 | Inoue et al. | 55/155 |
| 4,789,504 | 12/1988 | Ohmori et al. | 264/22 |
| 5,411,576 | 5/1995 | Jones et al. | 95/57 |
| 5,534,335 | 7/1996 | Everhart et al. | 428/224 |

*Primary Examiner*—Newton Edwards
*Attorney, Agent, or Firm*—Monte R. Browder

[57] ABSTRACT

Ethylene/carboxylic acid ionomers may be made, using a meltspun, and particularly meltblown process, into microfibers and thence to filter webs which are efficient gas filters for removing particles having a diameter of from 0.5 to 20 microns from a gas. The webs are effective without a deliberate specific post-charging operation during production. A deliberate post-charging operation can also be carried out to result in further efficiency.

3 Claims, No Drawings

MELTBLOWN IONOMER MICROFIBERS AND NON-WOVEN WEBS MADE THEREFROM FOR GAS FILTERS

BACKGROUND OF THE INVENTION

1. Field of the Invention

The invention relates to microfibers made from ethylene/carboxylic acid ionomers, the fibers being meltspun, particularly using the 'meltblown' process. The microfibers in the form of a web material can be efficient gas filters without being electretized. The materials, however, may also be electretized.

2. Description of Related Art

Non-woven materials are well known and widely used in a variety of applications including apparel, adhesives, sorbents and filters. These materials are made from matted, entangled non-bonded, but also melt-bonded fibers. When the matting is very tight, the non-woven material may be thought of as fabric-like. Such non-wovens may be useful, for instance, for apparel. When the matting is relatively loose and open it may considered, and is often referred to as, a 'web'. The form of a web may be thick or thin and the fibers entangled and/or bonded with varying degrees of openness, and with variations in the degree of bonding.

The properties of non-woven materials vary widely, from tough to relatively weak, flexible to stiff, highly porous to having low porosity, with highly absorptive or less absorptive capacity, yet may even have barrier characteristics, especially to liquids. The nature of non-wovens depends on (i) what material is used to make the fibers (ii) the nature of the fibers—which will depend on the process used to make them, and (iii) how the fibers are bonded together. It may be fair to say that the variation in the type and applications of non-wovens is as great or greater than that of woven materials.

A major market for non-wovens is in the filtration market, for gases and liquids. Gas filtration involves removing particulate matter, usually solid such as dust, but also liquid particles, from a gas, particularly air. Typical markets include heating ventilating and air conditioning (HVAC). Demanding markets such as pharmaceuticals, microelectronics and biotechnology use highly efficient or ultra efficient particulate air filters (HEPA and UFPA).

Because of the differing gas filter applications, the demands of, and characteristics of gas filters are varied. The filter may require high flux (i.e., high gas throughput) requiring high permeability, and/or require a high level of particle removal, and/or require removal of specific size particles. To a large extent flux, often quantified and measured in terms of the 'pressure drop' across the web, and the 'filtration efficiency' are conjugate quantities. Thus tighter filter webs may be more efficient but have lower permeability. The filtration efficiency however must always be characterized in relation to the particle size filtered. The drive in filter technology is towards improving the efficiency at given flux, or improving flux at a given efficiency—as well as reducing cost, of course.

The 'architecture' of a filter web depends on the fiber diameters, and the distribution of the diameters, how the fibers are entangled/bonded together, the density of web, its uniformity, and the thickness and weight per unit area. These architectural features are a major factor in filter efficiency, the flux, and the size particles which they remove. To filter out small particles, it is necessary to have fine fibers and small passages throughout the web, with no large channels (somewhat comparable to a finer mesh in a woven filter). Webs made of 'microfibers' as opposed to fibers of the size of normal textile fibers are used for filtering fine particles in the 0.1 to about 20 micron region.

While fibers for filter webs are often made of glass, synthetic thermoplastic polymers are also commonly used. Microfibers of synthetic thermoplastic polymers are commonly meltspun, particularly by a process known as the 'meltblown' process, though certain other processes can produce microfibers such as fibrillating film. The meltblown process has been succinctly defined as 'a one-step process in which high-velocity air blows a molten thermoplastic resin from an extruder die tip, onto a conveyor or take-up screen, to form a fine-fibered self-bonding web'. A meltblowing apparatus suitable for the production of microfibers was described in Report No. 4364 of the Naval Research Laboratories, published May 25, 1954, entitled 'Manufacture of Super Fine Organic Fibers', by Van Wente et al.

The ability to make microfibers from synthetic polymers, and the nature of the resulting web produced in the meltblown process depends on the melt rheological and crystallizing or, more generally, solidifying characteristics of the polymer. Other technologies that, in a broader sense, could be considered meltblown, or more generally meltspun processes, and can produce microfibers include electrostatic melt-spinning, flash spinning and centrifugal spinning.

For filtering fine particles however, the appropriate web architecture is a necessary factor but may not be the only factor in determining efficiency. Another major factor is the electrostatic nature of the surface of the polymer fibers. This is significantly dependent on the chemical nature of the polymer composition, the molecular conformation within the fiber, and the surface nature of the fibers made from it. Generally, filter microfibers are subjected to a surface treatment to increase their electrostatic charge or polar nature. So-called 'insulating' polymers, those with high resistivity, are 'electretized' which is sometimes said to mean 'electrified to possess permanent dielectric polarization' or 'electrified to make an electret' or to possess an 'electret surface'.

A deliberately produced electret surface on filter web microfibers may be produced at different stages of forming the filter. A material may be treated even before fiber formation, such as a sheet before fibrillation. Fibers may be treated during or after their formation, or the treatment may be carried out during or after the actual web formation. Such treatment is conventionally done by a procedure involving rubbing or corona charge treatment. Other techniques for providing electret enhancement are described in U.S. Pat. No. 4,375,718 (Wadsworth); No. 4,588,537 (Klaase) and No. 4,592,815 (Nakao).

U.S. Pat. No. 4,215,682 (Kubik et al.) teaches that filtering efficiency of a meltblown microfiber web can be improved by a factor of two or more when made into an electret.

While electrets are often referred to as having a 'permanent dielectric polarization', which leads to or is associated with a surface charge, in fact to a greater or lesser degree, the electrostatic charge or permanence of surface polar nature, whatever its precise nature, decays with time. The usefulness of electret enhanced filtering is of course dependent on how permanent the electret nature is, in relation to the time span for use of the filter.

The most commonly used polymer for making such electret filters is polypropylene but other fibers have been used. U.S. Pat. No. 5,411,576 (Jones et al.) states that other polymers may be used, such as polycarbonates and polyhalocarbons, that may be meltblown and have appropriate volume resistivities under expected environmental conditions.

U.S. Pat. No. 4,626,263 (Inoue) discusses the characteristics of electets made of non-polar and polar polymers. Non-polar polymers such as polyethylene and polypropylene are indicated to produce stable electrets, but of relatively low electrostatic charging capacity, while polar polymers are indicated to have high initial electet capacity, but relatively rapid decay, particularly under humid conditions.

U.S. Pat. No. 4,789,504 (Ohmori et al.) discloses microfibers which are able to be more permanently electretized than prior art materials. The materials used to make the fibers consist of polymers which include polypropylene, polyethylene, polyester, polyamide, poly(vinyl chloride), poly(methyl methacrylate) etc., containing 100 ppm or more, preferably 200 to 2000 ppm, in terms of the metal, of a fatty acid salt such as an aluminum, magnesium or zinc salts of palmitic, stearic or oleic acid.

Electretizing generally requires extra steps and use of special equipment after or during making of the fibers or webs. There is a need for materials which can be made into filter webs without the need to post-charge or deliberately electretize, yet which have comparable or better efficiency/flux. At the same time, if such materials can be electretized to produce filters with even greater efficiency, then the materials serve yet an added need.

SUMMARY OF THE INVENTION

The invention depends on the recognition that ethylene/carboxylic acid ionomers appear to be uniquely suitable for microfibers for filters, particularly since it is not necessary to deliberately post-charge or electretize the fibers or fiber webs, though they may additionally benefit from a deliberate electretizing process. The fibers have high static retention of any existing or deliberate specifically induced static charge which makes them excellent gas filters either without electretizing, as well as with an electretizing step.

Specifically, the invention comprises meltspun, particularly meltblown microfibers for filter webs the fibers made from a copolymer comprising:

a copolymer of ethylene, 5 to 25 weight percent of (meth)acrylic acid, and optionally, though less preferably, up to 40 weight percent of an alkyl (meth) acrylate whose alkyl groups have from 1 to 8 carbon atoms, having from 5 to 70 percent of the acid groups neutralized with a metal ion, particularly zinc, sodium, lithium or magnesium ions, or mixtures of these, the copolymer having a melt index of from 5 to 1000 g/10 minutes.

A further aspect of the invention are non-electretized filter webs made from the above fibers. Yet another aspect are electretized filter webs made from the above fibers. Yet a further aspect of the invention are microfibers and webs of those microfibers where the material used to make the fibers is a blend of the above ionomer and another polymer, where the ionomer is at least 10 weight percent of the blend composition.

DETAILED DESCRIPTION OF THE INVENTION

The precise nature of an 'electret surface' is variable and not always subject to easy characterization. While an electret surface is normally induced by various deliberate treatments, the polymers of this invention may possess an electret-like surface without deliberate post-charge treatment of the fibers or web. Therefore, in view of certain ambiguity to the term electret, the claims simply distinguish between material which has been 'deliberately electretized' by the various disclosed treatments and those that have not. The question as to whether non-treated surfaces of the polymers of this invention have a surface which could be described or resemble an 'electret surface' or is an electret is thus avoided.

In this disclosure, the word copolymer means a 'direct' near-random copolymer, (as distinct from a graft copolymer) polymerized from two or more comonomers, and thus includes dipolymers, terpolymers etc.

Microfibers, as the term is used in this application means fibers having an average diameter of less than about 30 microns.

The copolymers used to make the microfibers of this invention are ionomers. Many ionomers are well known commercially. The ionomers of this invention are metal ion neutralized copolymers of ethylene with acrylic or methacrylic acid or both. The option of either or both of these acids will be designated by the shorthand term '(meth) acrylic acid'. Ionomers of this type are sold under the tradename of SURLYN® ionomer resins, by E. I. du Pont de Nemours and Company, as well as other companies. The ionomer copolymers of the invention contain 5 to 25 weight percent, preferably 8 to 20 weight percent (meth)acrylic acid, most preferably 8 to 15 weight percent. Optionally they may contain up to 40 weight percent of a 'softening' monomer which is an alkyl acrylate with a 1 to 8 carbon alkyl group. Preferably however, the ionomer is a dipolymer with no softening monomer. The carboxylic acid groups are partially neutralized; from 5 to 70 percent, preferably 25 to 60 percent of the acid groups being neutralized with metal ions, preferably of sodium, zinc, lithium or magnesium (or mixtures of these), most preferably sodium or zinc. Ions which produce more hydrophilic ionomers such as potassium are less preferred unless the degree of neutralization is at a relatively low level. Non-neutralized acid copolymers are less suitable for making the microfibers of this invention.

Acid copolymers and their preparation are described in U.S. Pat. No. 4,351,931 (Armitage), and ionomers and their preparation from acid copolymers are described in U.S. Pat. No. 3,264,272 (Rees). 'Soft' ionomers containing alkyl acrylates are described in U.S. Pat. No. 4,690,981 (Statz). Preparation of acid copolymers containing higher levels of acid are advantageously prepared by a modified method, referred to as 'cosolvent technology' which is described in U.S. Pat. No. 5,028,674 (Hatch et al.). All four above patents are hereby incorporated by reference.

A meltblowing apparatus suitable for preparation of the microfibers of the present invention is described in the Naval Research Laboratories Report 4364, discussed in the Related Art Section. Further descriptions of meltblowing apparatus also suitable for the present microfibers have been more recently given in the TAPPI Journal, 78, 185, 1995 by Sanjiv R. Malkan, and by L. C. Wadworth et al. in 'Melt Blown Technology Today', Miller Freeman, 1989. Typically, and as employed in the present invention, the apparatus consists of an extruder, a metering pump, a die assembly and web formation and winding equipment. The distinct feature is the die assembly, consisting of a polymer feed distribution system, a die nosepiece and air manifolds. The air manifolds supply the high-velocity hot air at temperatures between about 400° and 600° F. through slots in the die nosepiece. As soon as the molten polymer is extruded from the die holes, the high-velocity hot air streams attenuate (thin/divide) the polymer streams to form microfibers. As the hot air stream containing the microfibers progresses towards a collector screen, it draws in a large amount of surrounding air that cools and solidifies the fibers. The solidified fibers subsequently get laid randomly onto the collecting screen, forming a self-bonded non-woven web.

U.S. Pat. No. 3,825,380 (Harding et al.) describes a die with specific nose configuration, for production of non-woven mat. This patent is also hereby incorporated by reference.

For ionomers of the present invention, water jets are desirable to facilitate microfiber cooling, producing a more uniform web, without overly fused bond areas.

The microfibers of this invention have an average diameter in the range of 0.5 to 30 microns, preferably 0.5 to 10 microns and most preferably 1 to 5 microns. Fibers in the broad range, but preferably in the narrow range are of a suitable diameter for removing particles in the 0.1 to 20 micron size, the size of particle removed by the fiber webs of this invention. Non-woven filter webs of this invention, produced from the microfibers, have a weight of between 0.5 and 10 oz./square yard, preferably between 0.7 and 3 oz./square yard. The web thickness should be between 5 and 30 mils.

Within these limits considerable variation is possible. It is within the skill of the artisan to vary the architectural dimensions and features within these limits and improve, and eventually optimize the filtering efficiency/flux for the desired utility.

The microfiber filter webs of this invention, may be used as part of a filter structure, and may be laminated with a layer of a different (generally spunbonded) web, or can be in the form of a three-layer sandwich in which the meltspun, particularly meltblown microfiber web forms the core, while the different spunbonded web forms the outer layer. Spunbonded non-woven webs and its fibers of the type useful for such sandwich structures, can be made by any convenient process, for example by melt-spinning the polymer as described in U.S. Pat. Nos. 3,821,062 (Henderson), 3,563,838 (Edward) and 3,338,992 (Kinney). The different spunbonded web fibers of the sandwich should have a diameter of at least 20 microns and thus is considerably higher than the preferred microfiber diameter of 1 to 5 microns used for the core web. The different spunbonded layer provides mechanical strength and integrity, while the core layer provides the desired microporosity and filter properties.

The filter webs need not be deliberately electretized to be highly efficient filters. That is not to say that the webs can not benefit further from a specific post-charging/electretizing step. In brief preliminary experiments discussed below, on a less than optimum ionomer web, post-charging/electretization was found to improve filtering efficiency, just as it is known to do for other microfibers.

In past tests prior to the present development study, rate of decay of static charge of a SURLYN® ionomer resin which was an ethylene methacrylic acid copolymer with 10 weight percent acid neutralized with zinc was compared with a typical LDPE. Static retention at 100 seconds was 96% for the SURLYN® ionomer resin compared with 55% for the LDPE, while at 1000 seconds it was 94% compared with 25% for the LDPE. While the test was not carried out on a filter and the data can not be translated to filter behavior precisely, it nevertheless suggests a significant difference in behavior between ionomer resins and polyethylene. Ionomers have high volume resistivity. It is not completely understood why, in view of the highly polar nature of ionomer resins, they should make such good filters, have such high resistivity, and retain static charge so well.

The ionomers of the invention can have a melt index (MI) anywhere between about 5 and 1000 g/10 minutes. However, because a moderately fluid melt is desirable for meltblowing, the MI should preferably be between 30 and 400 g/10 minutes more preferably between 60 and 350 g/10 minutes and most preferably between 150 and 350 g/10 min. The more fluid, the easier it is to produce fine microfibers, but too high an MI may detract from fiber strength, and may lead to excessive fiber bonding. It is also important to have the polymer solidify with adequate bonding of fibers, but not too much 'coalescence' by excess fusing, which produces areas where the fibers lose their fibrous identity. For this reason, generally, the more rapid the crystallization and higher melting point, the better. Ionomers, have low softening temperatures, and in this regard require special care in meltblowing a satisfactory web. Dipolymers are preferred to terpolymers because they crystallize more readily. Other means which can raise melt temperature of the ionomer, such as polymerizing at a temperature lower than about 200° C. may help also. However, standard ionomers prepared at between 220° C. and 270° C. and pressures between 23,000 and 25,000 psi, according to the Rees patent noted above, are entirely suitable. Nevertheless, it has been found highly advantageous to cool the microfibers as quickly as possible with water, to prevent excess bonding.

Ionomer microfibers produce highly efficient filter webs. This efficiency may also be utilized in mixed fiber webs also containing fibers other than ionomers.

Ionomers whether deliberately post-charged or not, in the form of film or sheets may also find applications as the electrostatic element in electro-acoustical devices such as microphones, headphones and speakers, generators and recorders.

EXAMPLES

Microfiber webs of ionomer resins, (either experimental or commercial grades), as well as webs of two grades of HDPE and LLDPE were prepared. Webs were also made of blends of ionomer resins and polypropylene and blends of ionomer resins and polyethylene.

The meltblown webs were made in a 20 inch meltblowing line consisting of a 2 inch screw extruder and metering pump to control the polymer throughput per die hole in the range of 0.3 to 2 grams/minute. The 20 inch horizontal die had 25 holes per inch and 0.0145 inch diameter holes. A furnace for heating the air, and an air compressor with a maximum capacity of 650 sq.ft./minute was used to attenuate the fibers from the die-tip to a moving drum collector. Except for a first, preliminary series of scouting tests, high-pressure water jets were introduced 2 to 3 inches from the die to enhance fiber cooling for the ionomer resin webs, before collecting on the drum. The die to collector distance was maintained, for most webs, at 11 inches. Conditions to make what is believed to be close to optimum fiber diameter are shown in Table 1.

Pore size distribution (minimum, maximum and mean) of the web was measured using a Coulter Porometer, as described in ASTM F-316-86.

The filtration efficiency was measured with polystyrene spheres of nominal sizes of 0.6, 1, 2 and 3 microns in diameter, at the 30 cm/sec face velocity. Pressure drop across the filter media is reported in inches of water. The test is a modified ASTM 1215 filter efficiency test in that four different particle sizes were tested simultaneously.

A first preliminary scouting series of tests utilized an ionomer resin filter web made, as noted above, without water cooling. As suggested above, it is believed the low crystallization temperature of the ionomers which is lower than the other polymers tested, produced a web with fused spots, leading to less than optimum filtration efficiency. The results shown in the table as Test Series 1 should therefore not be considered representative of the real potential of ionomer microfiber webs. After these first tests, water cooling of the web was employed, and this produced an ionomer filter web with much greater efficiency. In this test series the ionomer fibers had diameters in the range of 2 to 8 microns, still somewhat higher than the goal diameter of 1 to 5 microns. Results of these tests carried out on the ionomers and polyethylene samples, together with a commercial post-charged polypropylene web, and a commercial auto cabin filter based on polycarbonate resin are shown in Table 2.

As noted above, the filtration efficiency and flux, as indicated by pressure drop for a filter web depends on two principle factors: (i) the web architecture and (ii) the polymer and its surface charge. In comparing two polymers, the quite different melt and crystallization characteristics of different polymers make it difficult to achieve truly comparable webs of similar architecture for the two polymers. The only totally satisfactory comparison of filtering efficiency would be to compare different polymers with the best possible web achievable with of each of those polymers. One would have to vary web making conditions extensively, and test each, selecting the web which gave the best results for a given polymer. Unfortunately, one could never be sure that the best web for that polymer for a given filter requirement was produced. Microscopic examination however can give a crude guide as to whether two polymers had comparable architecture.

The difference in the results for ionomer in series 1 and 2, as shown in the table, make it clear that the ionomer webs in the first series were less than optimum webs, the second series producing far superior results. As indicated this is believed to be due to the low melting point of the ionomer resin, producing fused webs.

The first series also included ionomer web which had been specifically deliberately electrostatically post-charged for comparison with commercial electretized polypropylene. In this test, filtration efficiency for 0.1 micron particles, at generally comparable web thickness and pressure drop, was the same order for the ionomer resin as for the polypropylene both for the charged and non-charged web samples, though somewhat higher for the polypropylene. Uncharged, the values were 32 versus 41 for polypropylene and charged 87 versus 98 for the polypropylene. LLDPE was very much poorer than either. While these data relate to less than optimum webs, they indicate that ionomer resin, like polypropylene resin, can benefit from deliberate post-charging. However, the actual values obtained, as indicated above, do not represent significant numbers in terms of the efficiency possible with the material, in view of the non-optimum web structure.

The second series produced an ionomer web which gave far superior results to the first series ionomer webs. In this series of tests, while it is impossible to be sure that each of the webs of different materials was close to optimum for that material, the webs were generally microscopically comparable in appearance. The polycarbonate and the PP-electret were both commercial webs, and presumed to have been produced under reasonably optimum conditions. Web thickness is noted if measured, but is not particularly critical, the critical criterion of the filter being efficiency as a function of pressure drop.

The results indicate that the ionomer which was not deliberately charged is equal to or even superior to the commercial polypropylene electret, for particles from 0.6 to 3.0 microns diameter. The non post-charged ionomer sample with comparable web base weight of 2 oz./square yard is superior to the charged polypropylene sample. In fact the polypropylene sample had a greater pressure drop (0.33 versus 0.23). Since efficiency and pressure drop are largely conjugate characteristics of a filter, the non-charged ionomer shows superior performance.

The conjugate nature of efficiency and pressure drop can be seen from the three ionomer samples. As the web base weight increases, so does filter efficiency, but at the expense of increased pressure drop from (0.1 to 0.23). The non-charged polycarbonate cabin filter is less efficient than the ionomer at comparable pressure drop of 0.23. Comparing the polyethylenes, a comparison can be made at a pressure drop of about 0.1 (0.12 for LLDPE). When comparison is made at this pressure drop, the ionomer is far superior to either the HDPE or the LLDPE.

The very high filtration efficiency of the ionomer resin for all particles sizes, even without deliberate post-charging, makes it clear that this is a truly unique and excellent material for microfiber filters. It is quite possible that without a specific deliberate charging operation, ionomer microfibers readily acquire a static charge or an electret-like surface of some sort, which results in their high filter efficiency with webs made from them.

A further series of tests was carried out on webs of blends of ionomer resin and either polypropylene or polyethylene. The two polymers were fed into the extruder and the extrudate blend microfibers made into a web as usual. The results in Table 2 show that even 20 percent ionomer improves the filter efficiency of blends either with polyethylene or polypropylene. Increasing the amount of ionomer to 50% did not further improve efficiency significantly. The ionomer presence dominates even at the 20 percent level, and is particularly effective in the polyethylene blends. The efficiency improvement is more marked for particles of 2 and 3 microns than it is for particles of 1 micron and less. Based on these results, blends containing as little as about 10 percent ionomer are likely to show at least some improvement over webs made from polyolefin alone.

TABLE 1

PROCESS CONDITIONS FOR MAKING WEBS
(For Series 2 and 3 as per Table 2)

| Polymer | Throughput g/min. per hole | Air flow rate (cubic ft. per minute) | Air Temp. °F | Die Temp. °F. | Die Collector distance (in.) | Water Jet (On/Off) |
|---|---|---|---|---|---|---|
| LLDPE | 0.4 | 550 | 440 | 430 | NM | Off |
| HDPE-1 | 0.4 | 610 | 443 | 430 | NM | Off |
| HDPE-2 | 0.35 | 620 | 444 | 430 | NM | Off |
| Ionomer | 0.35 | 630 | 400 | 400 | NM | On |
| Ionomer/PP | | | | | | |
| 20/80 | 0.34 | 630 | 418 | 450 | 15 | On |
| 50/50 | 0.34 | 630 | 418 | 450 | 11 | On |
| Ionomer/PE | | | | | | |
| 20/80 | 0.34 | 610 | 400 | 400 | 11 | On |
| 50/50 | 0.34 | 610 | 400 | 400 | 11 | On |

For description of polymers see Table 2. Conditions for the preliminary scouting tests of series 1, table 2 were not recorded.

TABLE 2

FILTRATION EFFICIENCY OF VARIOUS MELTBLOWN WEBS

| Test Series | Polymer | Base Weight (oz/sq.yard) | Web Thickness (mils) | Pore Size (microns) Min. | Pore Size (microns) Max. | Pore Size (microns) Mean | Efficiency for particle of size: (microns) 0.1 | 0.6 | 1.0 | 2.0 | 3.0 | Pressure Drop (in. H$_2$O) |
|---|---|---|---|---|---|---|---|---|---|---|---|---|
| 1 | Ionomer | 2.3 | 10.6 | | | | 32 | | | | | 0.6 |
| 1 | Ionomer/Elec. | 2.3 | 10.6 | | | | 87 | | | | | |
| 1 | PP | 2.1 | 9.3 | | | | 41 | | | | | 0.7 |
| 1 | PP-Electret | 2.1 | 9.3 | | | | 98 | | | | | |
| 1 | LLDPE | 1.7 | 10.7 | | | | 11 | | | | | |
| 2 | LLDPE | 1.1 | 6.9 | 15.7 | 97.3 | 32.6 | 16.2 | 22.4 | 23.3 | 39.8 | 67 | 0.12 |
| 2 | HDPE-1 | 0.8 | 7.9 | 18.3 | 157.8 | 37.2 | 10 | 7.3 | 11.3 | 28.2 | 52.9 | 0.1 |
| 2 | HDPE-2 | 0.8 | 8.0 | 19.1 | 208.6 | 40.6 | 7.5 | 4.5 | 5.8 | 19.4 | 39.2 | 0.08 |
| 2 | Ionomer | 1.0 | 6.6 | 16.0 | 127.3 | 34.5 | 60 | 61 | 60.2 | 66.6 | 74.1 | 0.1 |
| 2 | " | 1.4 | 10.4 | 17.9 | 93.2 | 33.0 | 77.3 | 73.7 | 71.8 | 82.2 | 88.2 | 0.18 |
| 2 | " | 1.9 | 12.5 | 16.8 | 77 | 29.6 | 86.5 | 86 | 86.5 | 93.7 | 97.1 | 0.23 |
| 2 | Polycarbonate | 7 | NM | | | | | 73.5 | 73.5 | 78 | 90.5 | 0.23 |
| 2 | PP-Electret | 2 | NM | | | | | 83.2 | 84.8 | 92.3 | 95.3 | 0.33 |
| 3 | Ionomer/PP 20:80 | 2 | | | | | | 20 | 38 | 79 | 86 | 0.25 |
| 3 | Ionomer/PP 50:50 | 2 | | | | | | 27 | 43 | 80 | 89 | 0.25 |
| 3 | Ionomer/PE 20:80 | 2 | | | | | | 59 | 73 | 90 | 95 | 0.13 |
| 3 | Ionomer/PE 50:50 | 2 | | | | | | 59 | 73 | 91 | 96 | 0.14 |

Notes to Table 1 and 2:
NM = not measured.
LLDPE is Aspun ® 6831 A mfg. by Dow Chemical, MI = 150
HDPE-1 is Alathon ® 5280 mfg. by Lyondell MI = 80
HDPE-2 is Alathon ® 5050 mfg. by Lyondell MI = 50
The Ionomer is an E/MAA (90/10) by wt. ~20% Zinc neutralized, MI = 300, an experimental ionomer polymer.
PP-Electret, commercial product of 3M Company.
PP in Table 1 was a commercial non-electretized web.
PP used in blends, (series 3) was Exxon Grade PP-1200
Polycarbonate is a Cabin Filter mfg. by Frudenberg. Co.
cfm = cubic feet/minute.

We claim:

1. Microfibers, made from a polymer comprising:

a copolymer of ethylene, 5 to 25 weight percent of (meth)acrylic acid, and optionally up to 40 weight percent of an alkyl (meth)acrylate whose alkyl groups have from 1 to 8 carbon atoms, having from 5 to 70 percent of the acid groups neutralized with metal ions, the copolymer having a melt index of from 5 to 1000 g/10 minutes.

2. The microfibers of claim 1 produced by a meltblown process.

3. The microfibers of claim 2 which are made from an ethylene (meth)acrylic acid dipolymer having from 8 to 20 weight percent acid, with from 25 to 60 percent of the carboxylic acid groups neutralized with zinc, sodium, magnesium or lithium ions, or a mixture of these ions, the dipolymer having a melt index of from 150 to 350 g/10 minutes.

* * * * *